United States Patent

Yao

[15] 3,641,360

[45] Feb. 8, 1972

[54] DYNAMIC SHIFT/STORE REGISTER

[72] Inventor: Ying L. Yao, Mahopac, N.Y.

[73] Assignee: International Business Machines Corporation, Armonk, N.Y.

[22] Filed: June 30, 1969

[21] Appl. No.: 837,597

[52] U.S. Cl. ..........................307/221 C, 307/251, 307/279, 307/304

[51] Int. Cl. ..........................G11c 19/00

[58] Field of Search ..............307/304, 205, 215, 221–221 C, 307/246, 251, 279; 328/37

[56] References Cited

UNITED STATES PATENTS

| | | | |
|---|---|---|---|
| 3,395,292 | 7/1968 | Bogert | 307/304 |
| 3,406,346 | 10/1968 | Wanlass | 307/221 C |
| 3,431,433 | 3/1969 | Ball et al. | 307/251 |
| 3,461,312 | 8/1969 | Farber et al. | 307/221 C |
| 3,483,400 | 12/1969 | Washizuka et al. | 307/279 |
| 3,497,715 | 2/1970 | Yen | 307/221 C |
| 3,523,284 | 8/1970 | Washizuka et al. | 307/221 C |

OTHER PUBLICATIONS

Sidorsky, "MTOS Shift Registers" Application Notes Dec. 1967 General Instrument Corporation – Microelectronics Division, (7 pages)

*Primary Examiner*—Donald D. Forrer
*Assistant Examiner*—R. E. Hart
*Attorney*—Hanifin and Jancin and Jackson E. Stanland

[57] ABSTRACT

A dynamic shift register having storage capabilities. A regeneration circuit connected between the different sections of any stage (bit storage position) allows indefinite storage without shifting between stages. MOSFETS are used in a preferred embodiment and interelectrode capacitances are used to store data. Voltages on these capacitances are regenerated during store operation, rather than shifting the voltages in the direction of data shift.

20 Claims, 8 Drawing Figures

SHIFT OPERATION

STORE OPERATION

INVENTOR
YING L. YAO

BY J.E. Haulant
AGENT

DYNAMIC SHIFT/STORE REGISTER

BACKGROUND OF THE INVENTION

1. Field of the Invention

This invention relates to shift registers, and more particularly to a dynamic shift register having storage capability, without shifting of data between stages.

2. Description of the Prior Art

Shift register systems are well-known logic components which are used for both memory application and time delay application. They are systems which receive a data signal and a shifting, or clocking signal, and which transfer the data signal under the control of the clock signal. A plurality of shifting systems may be connected together in order to provide large delays.

Metal-oxide-semiconductor field effect transistor (MOSFET) shift registers, having both single and multiphase clock pulses, are classified into two major categories according to their frequency characteristics. These are: Static Shift Registers, and Dynamic Shift Registers.

A static shift register is one in which it is possible to "store" the data indefinitely, without the necessity of continually applying clock pulses. That is, once a complete cycle of clock pulses is applied, the output of any bit position (stage) will be indicative of the input data to that bit position when the cycle began. The various stages will be "locked" to the input data. It does not matter if the input data has since changed; once the cycle is completed, further data will not change the output of a bit position until another cycle of clock pulses begins. Therefore, the frequency (shifting rate) of a static shift register is from DC to some frequency $f$, the frequency $f$ being a function of how long it is desired to hold the state of the shift register before entering new data. Static shift registers will "store" data without the necessity of "shifting" such data.

A disadvantage with static shift registers is that they have slow speed due to an inherently large RC time constant between the load device and its corresponding node capacitance. Further, these circuits also require a fairly large chip area, when formed on integrated circuit chips. However, a static shift register has the advantage that it will store information indefinitely, without a shifting action. That is, data can be indefinitely retained without constant transfer from one stage to the next.

A dynamic shift register is one in which it is not possible to hold (store) data indefinitely without the application of clock pulses. That is, another cycle of clock pulses must be begun in order to retain the data. But with the onset of a new cycle of clock pulses, shifting of data occurs. Consequently, this shift register will not "store" data without "shifting" it. In normal operation, the data is stored by recirculating it, i.e., by feeding it back to the input of the shift register and again shifting it through each stage of the shift register. The shift frequency of a dynamic shift register is limited between $f_{min}$ and $f_{max}$. Here, DC operation is not possible, since the cycle of clock pulses must be repeated within certain frequency limits ($f_{min}$, $f_{max}$) in order to keep the data alive. No matter how large the time constant of a bit position, there will be a lower limit $f_{min}$ below which operation is not possible, without loss of data.

In both static and dynamic shift registers, it is known to use interelectrode capacitance (node capacitance) as the storage depots for retention of data. These node capacitances are the gate electrode capacitance of a switching element, and the capacitance of the interconnection leads. It is a capacitance to the substrate and is very small. Consequently, small time constants are possible even though high impedances are involved.

A disadvantage of dynamic shift registers arises because signals are transferred between interelectrode capacitances in each section. Since the charge on a capacitor can leak off with time, the capacitors have to be continually charged in order to retain information. There is a lower clock frequency limit, below which data leaks off a capacitor.

An advantage of the dynamic shift register, in addition to its being capable of higher speed, involves the chip area required when such a shift register is fabricated in an integrated circuit arrangement. The required chip area for a dynamic shift register is quite small, being approximately 50 percent of that required for a static shift register design.

In Ser. No. 403,482, filed Oct. 13, 1964 U.S. Pat. No. 3,461,312 and assigned to the assignee of the present invention, a dynamic shift register using MOSFETS is described. That shift register uses DC holding circuits in place of even-numbered half stages, when it is desired to store information indefinitely. These DC holding circuits are flip-flops, multivibrators, etc., which "hold" the data for some time, allowing storage of data in a stage.

However, such DC holding circuits are more expensive than the presently described circuit, and do not allow the data state to be regenerated within a stage. The holding circuits just "store" the data, as would a static shift register. The present invention provides storage of data, without shifting it between stages, and with a minimum of circuit hardware. In addition, it allows the output section of any stage to control the input section of that stage. Thus high-speed dynamic operation is achieved in a system having storage capability.

The subject invention describes a unique MOSFET register design which has the advantages of both the static shift register and the dynamic shift register. First, it will "store" the information indefinitely without "shifting" action. Secondly, the optimum speed of the subject inventive circuit is comparable with that of a normal dynamic shift register. Further, although there is an increase of chip area when compared to that of known dynamic shift registers, the total chip area required is still far smaller than the chip area required by the design of a comparable static shift register. Moreover, the elimination of extensive synchronization circuitry will offset the increase of required chip area, so that the overall design is very efficient.

Accordingly, it is a primary object of this invention to provide a shift register having only one stage.

It is a still further object of this invention to provide a dynamic shift register having storage capability, without increasing the number of required clocks.

Another object of this invention is to provide a dynamic shift register having storage capability, which shift register will operate with any number of clock phases.

Another object of this invention is to provide a dynamic shift register having storage capability, which shift register does not require greatly increased chip area when fabricated in integrated circuitry.

Another object of this invention is to provide a dynamic shift register having storage capability, which shift register is comprised of MOSFETS.

Still another object of this invention is to provide a dynamic shift register having storage capability, which shift register will operate equally well with overlapping or nonoverlapping clock pulses.

The foregoing and other objects, features, and advantages of the invention will be apparent from the following more particular description of the preferred embodiments of the invention, as illustrated in the accompanying drawings.

BRIEF SUMMARY OF THE INVENTION

This dynamic shift register has storage capability. There is a regeneration means provided between the sections of any stage. Therefore, voltages on MOSFET interelectrode capacitances, which voltages are representative of input data, can be regenerated during any phase of a cycle. This means that data will be "stored" indefinitely, without requiring a shifting operation, i.e., a transfer of data from one stage to another. Therefore, since a conventional shift register requires a minimum of two stages in order to store data (by shifting it), the subject invention can store information in one stage of a shift register. Of course, it is understood that a shift register of the proposed design can comprise many stages and that data can be stored in each stage or can be shifted from one stage to the next.

In distinction with conventional shift registers, there is provided a regeneration means between adjacent sections of any shift register stage. In conventional, prior shift registers, there is recirculation, but such recirculation is from the output back to the input of the shift register. It is just a means to reenter data; no regeneration is provided between sections of a particular shift register stage. The type of regeneration of the instant invention is not that which is normally considered recirculation, i.e., feedback from the output of any stage to the input of the preceding stage, or to the input of the first stage.

The regeneration means is a discharge circuit which allows any section to control the data state of a preceding section. It comprises two MOSFETS which have common source and drain diffusions. The output of any section is connected to the gate element of one MOSFET, while a clock pulse is connected to the gate of the second MOSFET. The regeneration means provides conditional regulation of the interelectrode capacitance by another (succeeding) capacitance of the shift register stage. Thus, if there are two sections in a stage, the state of the first section interelectrode capacitance is controlled by the state of the data output (state of the second section interelectrode capacitance).

DESCRIPTION OF THE PREFERRED EMBODIMENTS

Figure 1:
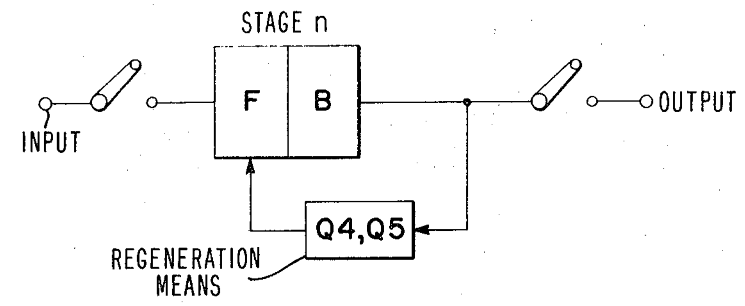
FIG. 1 is a schematic block diagram of a shift register stage according to the instant invention.

Referring to FIG. 1, a block diagram of one stage (*n*th) of the subject shift register is shown. Of course, the number of stages in the shift register can be any number, depending upon design requirements. Transfer of data takes place between adjacent stages. In the "shift" operation, data will be transferred from one stage to the next stage. In the "store" operation, data will stay in the same stage, similarly to operation in a static shift register.

The shift register stage shown in FIG. 1 has front (F) and back (B) sections and has a connection from its output to the front section (F) of the stage. This connection is a regeneration means, or restoration means, which enables storage of data in any stage *n*, without requiring a shifting operation. It is this regeneration means which distinguishes the stage shown in FIG. 1 from that of prior dynamic shift register stages. In the illustration to be given, more particularly shown in FIG. 2, a four-phase dynamic shift register stage is explained. In this particular case, stage *n* of FIG. 1 is a conventional four-phase dynamic shift register stage having means for reestablishing the data in stage *n*, thus providing a "store" function. Of course, there could be any number of sections in each stage, there being only two shown in FIG. 1 for ease of explanation.

In FIG. 1, data enters at the input terminal and is transferred, or shifted, from the output terminal to the next ($n$+1) stage. If desired, a STORE operation is performed, in which the regeneration means is utilized. In the SHIFT operation, there is no control of the first section (F) by the data state of the second section (B). Control is in the direction of data shift only.

The operation of the particular shift register stage shown in FIG. 1 leads to the conclusion that it is possible to store information in one stage of a shift register according to the subject invention. This is in contradistinction to normal dynamic shift registers in which at least two stages are required since, in conventional dynamic shift registers, information is stored by a shifting operation between stages.

Figure 2:
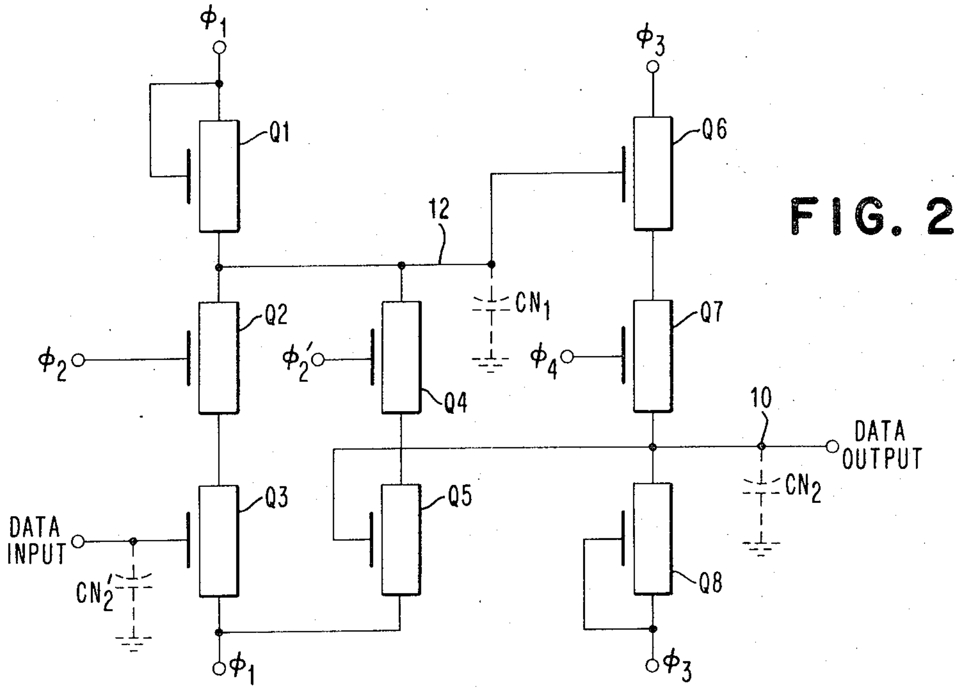
FIG. 2 is a schematic illustration of the circuitry of the shift register stage shown in FIG. 1.

FIG. 2 is a detailed circuit drawing of the dynamic shift register stage shown in FIG. 1. The front section of this stage is comprised of transistors Q1–Q3, while the back section of this stage is comprised of transistors Q6–Q8. The regeneration means is the network connecting the second section to the first section of the stage, and includes transistors Q4 and Q5. Consequently, there is a regeneration means between adjacent storage elements in each stage.

In FIG. 2 MOSFETS are employed, although the principles of this invention are not limited to operation with this particular type of switching element. Any switching element could be employed, although operation with MOSFETS is particularly desirable for many reasons, including device fabrication, etc.

A MOSFET is a switching element whose output terminals are generally called the source and drain, respectively, while the control terminal is generally termed a gate. The device has the characteristic that a closed circuit is established between its source and drain terminals when a suitable potential is applied to its gate terminal. A high impedance exists between the source and drain terminals when the gate is biased differently. In FIG. 2, N-channel enhancement mode devices are utilized, although it should be appreciated that the circuit will work equally well with P-channel depletion devices. With the switching elements shown in FIG. 2, a positive potential applied to the gate of any element will cause a low impedance path between its output terminals, and the device will be considered to be "ON."

In fabricating the circuit shown in FIG. 2, the source and drain connections of transistors in any particular column, such as transistors Q1–Q3, are common diffusions. Also, common gate metallizations can be used for transistors in the same column. The whole transistor circuitry can be fabricated in an integrated circuit arrangement by well-known integrated circuit techniques. In addition, various clock pulses such as $\phi_2$ and $\phi_2'$ can be easily derived from a single clock pulse source. This is done by providing logic circuitry which is also fabricated on the same chip as the shift register stage of FIG. 2. This will be explained in more detail later in the discussion of FIG. 5.

In FIG. 2, the front section of each shift register stage comprises transistors Q1–Q3, and has inputs for clock pulse $\phi_1$, clock pulse $\phi_2$, and the input data. The second section of the shift register comprises transistors Q6–Q8, and receives clock pulse inputs $\phi_3$ and $\phi_4$. An output terminal 10 is provided for output data which can then go to the succeeding register stage, or can be utilized directly from such output terminals.

There is a connection from the output terminal 10 to the front section of the shift register, and such connection is the regeneration means. It comprises transistors Q4 and Q5. This regeneration means is a connection between the storage element $CN_2$ of the second section, and the storage element $CN_1$ of the first section. It allows the data state of $CN_2$ to control the data state of $CN_1$, as will be seen more clearly later. Clock pulse input $\phi_2'$ is applied to the gate of transistor Q4.

In FIG. 2, two node capacitances, $CN_1$ and $CN_2$ are shown. Node capacitance $CN_1$ is the capacitance to the substrate of the metal line 12 connecting the gate of Q6 and the common diffusion of elements Q1, Q2, but is primarily comprised of the interelectrode capacitance of element Q6. It is shown as a dotted line since it is an inherent capacitance and represents a capacitance of the circuit to the substrate. Accordingly, $CN_2$ and $CN_2'$ are similarly defined capacitances to ground.

Figure 3:
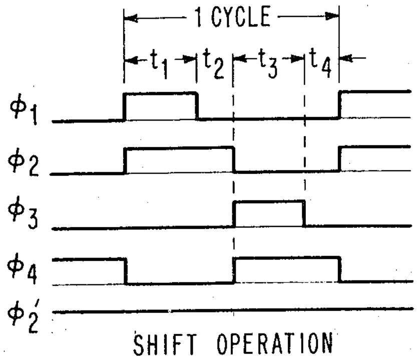
FIG. 3 is a timing chart for the "shift" operation of the circuit shown in FIG. 2.
Figure 4:
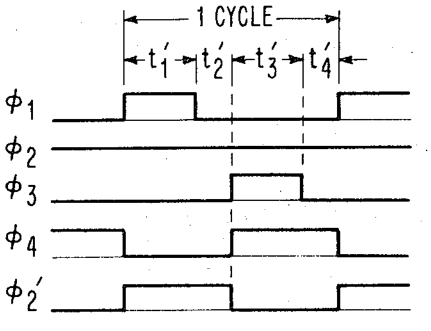
FIG. 4 is a timing chart for the "store" operation of the circuit shown in FIG. 2.

FIGS. 3 and 4 show the timing charts for the shifting operation and for the storing operation. These operations will now be explained.

SHIFT OPERATION

During the SHIFT operation, a continuous set of clock pulses $\phi_1$–$\phi_4$ are applied, while clock pulse $\phi_2'$ is kept low throughout the cycle $\phi_1$, $\phi_2$, $\phi_3$, $\phi_4$. A cycle is defined here as the amount of time required for a shift of data from the input of this stage to the output, i.e., from $CN_2'$ to $CN_2$. In describing the operation of this circuit, it should be remembered that a positive pulse applied to the gate terminal of any of the switching elements Q1–Q8 causes the switching element to conduct between its output terminals. This represents a low impedance state. Absence of a positive pulse applied to the gate of a switching element means that there is a high impedance between the output, i.e., the source and drain terminals, of the switching element.

The shifting cycle will shift data from the input ($CN_2'$) to capacitance $CN_1$ and then to the output capacitance $CN_2$ of the stage. The data on any capacitance will determine the data shifted to the succeeding capacitance.

1. During time period $t_1$, clock pulses $\phi_1$ and $\phi_2$ are up, while $\phi_3$ and $\phi_4$ are down. As mentioned above, $\phi_2'$, remains low throughout the SHIFT operation. During $t_1$, clock $\phi_1$ charges node capacitance $CN_1$ through Q1. This occurs whether or not there is input data represented by a high voltage on capacitor $CN_2'$, (if there is a previous stage).

2. During time period $t_2$, clock pulse $\phi_2$ discharges $CN_1$ through Q2 and Q3, if the data input is high. If the data input is not high, Q3 will represent an open circuit and $CN_1$ will not be discharged.

3. During time period $t_3$, clock pulse $\phi_3$ is up, and will charge node capacitance $CN_2$ through Q8. This is true, even though $\phi_4$ turns on Q7 during time period $t_3$.

4. During time period $t_4$, $\phi_3$ returns to a low voltage while $\phi_4$ remains in an up condition. This causes $CN_2$ to discharge through Q7 and Q6, if the voltage across $CN_1$ is high. That is, if the voltage across $CN_1$ is not high, Q6 will not be rendered conductive and there will not be a discharge path for the voltage across $CN_2$. In this case $CN_2$ will remain charged. This completes a shift of any data from the input to the output terminal. The operation here is identical with that of conventional four-phase dynamic shift register stages.

Since $\phi_2'$ remained low throughout the cycle of operation, Q4 was not rendered conductive. Therefore, Q4 and Q5 were disconnected from the circuit during the entire shift operation. These elements, which comprise the regeneration means, or restoration means, affect circuit operation only during the STORE mode.

STORE OPERATION

The STORE operation is established by applying clock pulse train $\phi_1$, $\phi_2'$, $\phi_3$, $\phi_4$ while keeping $\phi_2$ low throughout the cycle. In this way, the data input has no control over the state of $CN_1$, because Q2 is never rendered conductive. Instead, the state of $CN_1$ is controlled by the state of the data output ($CN_1$) through switching element Q5. During the complete cycle of $\phi_1$, $\phi_2'$, $\phi_3$, and $\phi_4$, voltages on $CN_1$ and $CN_2$ are both regenerated. Also, any change in these voltage levels due to leakage current will be corrected. In the STORE mode, the data state of any storage capacitance will determine the data state of the preceding storage element.

As an example, assume that the voltage on $CN_2$ is high, indicating a stored "1" in the stage.

1. During time period $t_1'$, $\phi_1$ and $\phi_2'$ are up, while $\phi_3$ and $\phi_4$ are down. This means that $CN_1$ will be charged by $\phi_1$ through Q1.

2. During time period $t_2'$, $\phi_1$ drops to a low state, but $\phi_2'$ remains in an up state. $\phi_3$ and $\phi_4$ remain at a low level. This means that Q4 will be conducting as will Q5 (Q5 conducts since we assume that the voltage across $CN_2$ was initially high). Therefore, $CN_1$ discharges through Q4 and Q5. It is important to note that any charge accumulated on $CN_1$ due to leakage will be cleared up during this discharge through Q4 and Q5.

3. During time period $t_3'$, $\phi_1$ remains at a low level while $\phi_3$ and $\phi_4$ are at a high level. $\phi_2'$ has returned to a low level. Since $\phi_3$ is up, Q8 conducts and $CN_2$ will be charged up by $\phi_3$. Remembering that $CN_2$ was assumed to be in an initially high state, it is clear that the operation of the circuit during this part of the cycle will reestablish any voltage loss of $CN_2$ due to leakage current.

4. During time period $t_4'$, $\phi_1$ remains at a low level and $\phi_3$ returns to a low level. $\phi_4$ remains in an up level while $\phi_2'$ remains in a low level. $CN_2$ will not discharge through Q7 and Q6, due to a low level on $CN_1$ which prevents Q6 from conducting.

Similarly, it can be shown that if $CN_2$ is originally in a low state, Q5 will not conduct and $CN_1$ will be charged up during phase $\phi_1$. To see this more clearly, during time period $t_2'$, $CN_1$ will not be discharged since the voltage on $CN_2$ is assumed to be initially low. This means that Q5 will not conduct. During time period $t_3'$, Q8 conducts and $CN_2$ will be charged up by $\phi_3$. During time period $t_4'$, $CN_2$ will be discharged through Q7 and Q6, since the high level on $CN_1$ (which is not discharged during time period $t_2'$) causes Q6 to be conductive.

Consequently, it is apparent that the addition of the regeneration means to a typical four-phase dynamic shift register stage, together with the appropriate clocking, provides dynamic shift/store capability. The circuit comprises eight identical MOSFET's compared to six MOSFET's for a typical four-phase shift register. However, the increase of chip area is less than 30 percent, because a common source or drain diffusion area is used for Q1, Q2, Q4, as well as Q3 and Q5.

Figure 5:
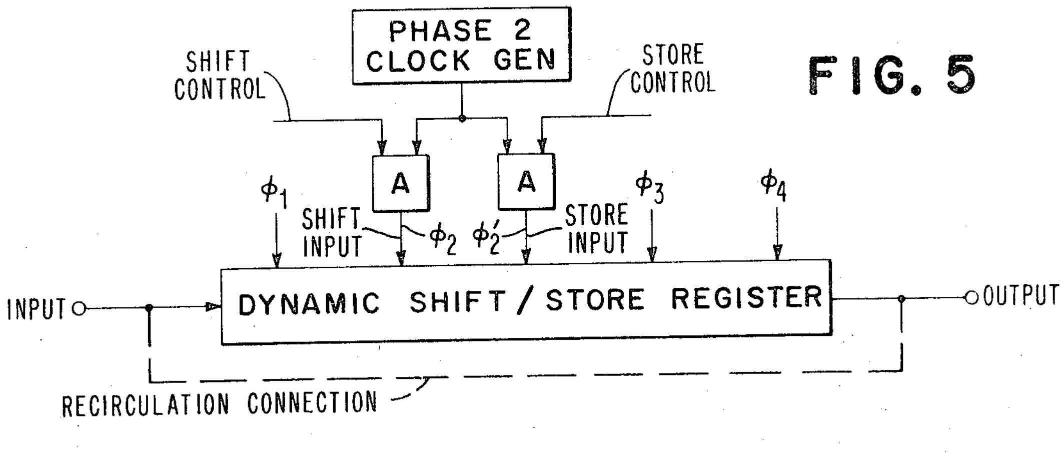
FIG. 5 is an illustration of the use of a single source clock for both the "shift" and "store" control of the subject dynamic shift/store register.

Since $\phi_2$ and $\phi_2'$ are both identical, timewise and waveformwise, these pulses can be easily derived from a single clock pulse source. This means that the shift register design of FIG. 2 does not require additional clock generating sources. The number of clock generating sources is the same as that for a regular four-phase dynamic shift register. FIG. 5 shows one arrangement for utilizing a single clock source to provide $\phi_2$ and $\phi_2'$ pulses.

In FIG. 5, a dynamic shift/store register is shown having a recirculation connection 14. Of course, it is readily apparent to one skilled in the art that recirculation can be provided and that such recirculation in no way anticipates or suggests the novel principle of regeneration between the sections of each shift register stage.

In FIG. 5, a single pulse generator 16 is used to provide $\phi_2$ and $\phi_2'$ clock pulses. As is apparent from FIGS. 3 and 4, clock pulse $\phi_2$ is a "shift" input pulse, while clock pulse $\phi_2'$ is a "store" input clock pulse. Phase two clock generator 16 provides an output which is directed to two AND-gates 18, 20. The other input to AND-gate 18 is the "shift" control signal while the second input to AND-gate 20 is the "store" control signal. Coincidence of the pulse from the phase two clock generator and either the "shift" control or the "store" control provides the outputs $\phi_2$ or $\phi_2'$. Additionally, it is readily apparent to one skilled in the art that the logic circuitry comprised of AND-gates 18, 20 can be provided on the same chip.

Power dissipation during STORE operation is greatly reduced by reducing the frequency of each of the clocks $\phi_1$, $\phi_2'$, $\phi_3$, and $\phi_4$. This is important in a memory design in order to keep the total system power to a minimum. Additionally, because of this store capability, any stored data can be read out instantly with the proper order; therefore, the memory access time can be reduced by as much as 50 percent.

Another advantage of the dynamic shift/store circuit illustrated by FIG. 2, is the capability of independent "set" or "reset" of each stage during a STORE mode. This feature is desirable for many shift register applications. To accomplish this capability, during a STORE cycle ($\phi_1$, $\phi_2'$, $\phi_3$ and $\phi_4$) $\phi_2'$ is purposely inhibited. Therefore, $CN_1$ will remain charged regardless of the state of $CN_2$. This is so because Q4 will be nonconductive if $\phi_2'$ is not present; therefore, there will be no discharge path through Q4 and Q5. Subsequently, $CN_2$ is discharged when $\phi_4$ is present, since Q7 will then be conductive. Also, the high voltage on $CN_1$ will make Q6 conductive.

On the other hand, if $\phi_4$ is inhibited during a complete STORE cycle, $CN_2$ will be charged up at the end of the cycle, indicating a stored "1." Therefore, terminals $\phi_2'$ and $\phi_4$ can be used conveniently as the reset and set inputs, respectively.

It will be readily understood by one skilled in the art that the subject invention describes a novel concept for providing storage capability in a dynamic shift register. This concept applies regardless of the phase of the shift register and regardless of whether the clock pulses are overlapping or nonoverlapping. By providing regeneration means by which the state of the storage capacitance in a section of a stage controls the state of a storage capacitance in a previous section of the same stage, storage operation is achieved in a fast operating dynamic shift register.

Figure 6:
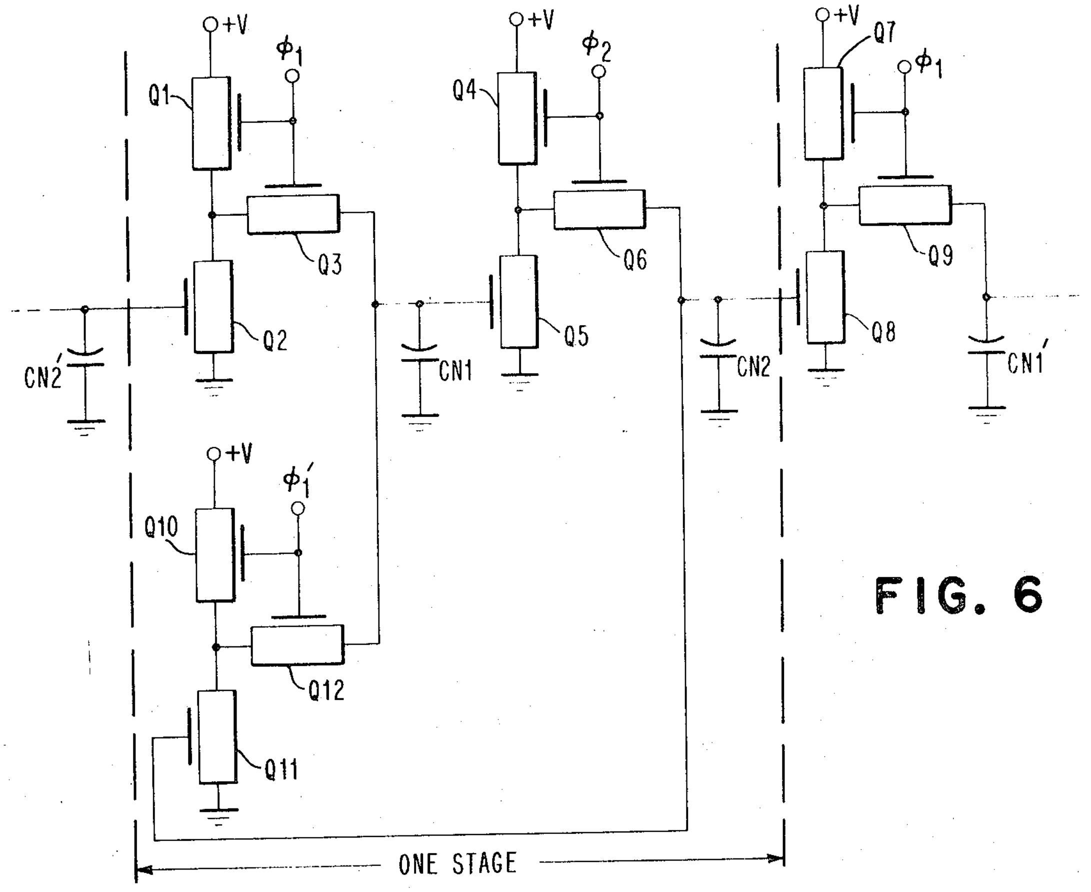
FIG. 6 is a schematic circuit diagram of a two-phase SHIFT/STORE register according to the present invention.
Figure 7:
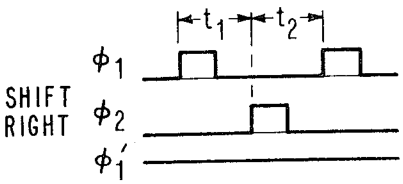
FIGS. 7, 8 are timing charts for operation of the circuit of FIG. 6 in a SHIFT mode and a STORE mode, respectively.
Figure 8:
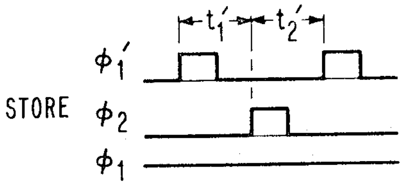

FIG. 6 is a schematic diagram of a two-phase SHIFT/STORE register having nonoverlapping clock pulses. The timing chart for a SHIFT operation is shown in FIG. 7, while the timing chart for a STORE operation is shown in FIG. 8.

In FIG. 6, there are two node capacitances per stage. Here, only one complete stage is shown. The node capacitances in this stage are $CN_1$ and $CN_2$. Node capacitance $CN_2'$ is the output capacitance of the previous stage, while node capacitance $CN_1'$ is the input node capacitance of the succeeding stage. In this embodiment, two storage elements (node capacitances) are used in each stage. It is to be understood that the number of storage elements per stage is not restrictive in the present invention.

As was the case with the circuits of FIG. 2, MOSFET's are used throughout. Each stage comprises storage elements and these storage elements are connected by a regeneration means. The regeneration means allows the state of a capacitance from which data is to be shifted to control the data state of the previous node capacitance. For instance, in a STORE operation, the voltage across $CN_2$ would control the voltage across $CN_1$. In the embodiment of FIG. 6, the regeneration means for this stage is comprised of switching elements Q10–Q12.

In the shift register stage of FIG. 6, the first section is comprised of switching elements Q1–Q3, while the second section is comprised of switching elements Q4–Q6. The regeneration means is, as mentioned previously, comprised of switching elements Q10–Q12. Between each node capacitance of a stage, there is means to enable the state of the previous node capacitance to conditionally regulate the state of the succeeding node capacitance. In addition, there is the regeneration means which allows the state of any capacitance to control the state of preceding capacitance. When data is being shifted, the regeneration means is electrically disconnected from circuit operation. However, when it is desired to store the data within a particular stage, the regeneration means is electrically connected into the circuit and allows control of the state of the preceding capacitance by the state of the succeeding capacitance. In this discussion, the words "preceding" and "-succeeding" have meaning as determined by the direction of data flow. For instance, when data is being shifted to the right, the capacitance $CN_1$ "precedes" the capacitance $CN_2$. During a STORE operation, the capacitance $CN_1$ is still "preceding" capacitance $CN_2$.

SHIFT OPERATION

For a SHIFT operation, clock pulses $\phi_1$ and $\phi_2$ are used. Clock pulse $\phi_1'$ is kept low.

1. During time period $t_1$, pulse $\phi_1$ is up, while the other clock pulses are down. Consequently, $CN_1$ is charged through Q1 and Q3. This a conditional charge, as it is dependent on the state of the input data. If the voltage across $CN_2'$ is high, $CN_1$ will not charge, since there will be a discharge path to ground through Q1 and Q2. During $t_1$, data is transferred from $CN_2'$ to $CN_1$.

2. During time period $t_2$, only clock pulse $\phi_2$ is present. Here, it is desired to transfer data from $CN_1$ to $CN_2$. Since $\phi_1'$ is low, the regeneration circuit is electrically disconnected. Capacitance $CN_2$ will be charged through Q4 and Q6, conditionally depending upon the state of $CN_1$. If a voltage has been applied across the $CN_1$ during $t_1$, then $CN_2$ will not be charged since there will be a discharge to ground through Q4 and Q5 during $t_2$.

During the SHIFT operation, data is transferred from $CN_2'$ to $CN_2$. For instance, if the voltage on $CN_2'$ were initially high, $CN_1$ would not charge during $t_1$; this would mean the voltage across CN1 would be low at the end of $t_1$. During $t_2$, the low voltage on $CN_1$ would mean that $CN_2$ would be charged to a high voltage V. Therefore, the voltage state on $CN_2$ would be that which initially applied to the shift register stage by $CN_2'$. Consequently, the state of any capacitance controls the data state of the succeeding capacitance during a SHIFT operation.

STORE OPERATION

During the STORE operation, it is desired that data which is already in the shift register be retained in that stage. That is, any data on output capacitance $CN_2$ is to be retained in the shift register stage during a complete cycle of clock pulses. In this case a complete cycle of clock pulses is $\phi_1'$, $\phi_2$. Clock pulse $\phi_1$ remains down during the STORE operation.

1. During time period $t_1'$, $\phi_1'$ is present. This means that Q10 and Q12 will be conducting. Capacitance $CN_1$ will be charged through Q10 and Q12, depending upon the voltage state across $CN_2$. If the voltage across $CN_2$ is high, then Q11 will be conducting and it will be a direct path to ground through Q10 and Q11. This means that a low voltage will exist on $CN_1$ after time period $t_1'$. If the voltage across $CN_2$ is low during $t_1'$, then $CN_1$ will be charged to a high voltage.

2. During time period $t_2'$, $\phi_2$ is present. This means that capacitance $CN_2$ will be charged through Q4 and Q6, depending upon the state of the voltage across $CN_1$. During the time period $t_2'$, the voltage state on $CN_1$ controls the voltage state on $CN_2$. If the voltage state on $CN_1$ were low after $t_1'$, then $CN_2$ would be charged to a high voltage V.

Consequently, during the STORE operation, data which is in any stage is essentially recirculated through that stage in order to provide storage operation. The regeneration means allows the voltage state of a succeeding capacitance to control the voltage state of the preceding capacitance.

From the above description, it should be readily apparent that each shift register stage can contain any number of storage elements. In addition, the regeneration means need not be placed between adjacent storage capacitance. They may, for instance, connect the first and the third storage capacitance in any stage. In this way, data will be stored even longer, since there will have to be two shifting operations to get the data where it originally was before the store operation. These choices are left largely to the designer, as is the choice of the particular data retention elements to be utilized. Use of MOSFET's is particularly convenient, since it allows fabrication ease and high speed circuitry.

What is claimed is:

1. A dynamic shift register, comprising:

a plurality of interconnected stages for storage of data, each said stage being comprised of first and second sections;

an input terminal to said first section for receiving data signals from another stage;

an input storage means on which said data is stored;

an output storage means for storage of data thereon, the data state of said output storage means being the data state of said stage;

first shift means connecting each said input storage means to the output storage means in that stage for shifting data from said input storage means to said output storage means in response to clock pulses applied thereto; second shift means connected between stages for shifting data between said stages in response to the application of clock pulses thereto;

regeneration means connected between said output storage means and said input storage means for regulating the data state of said input storage means in accordance with the data state of said output storage means when clock pulses are applied thereto;

clock means for applying said clock pulses to said first and second shift means and to said regeneration means.

2. The shift register of claim 1, where said first and second sections are comprised of field effect devices and said regeneration means is comprised of further field effect devices, the input and output storage means of each said stage being comprised of interelectrode capacitances of said field effect devices.

3. The shift register of claim 2, where said output interelectrode capacitance is connected to the gate electrode of one of said further field effect devices and said clocking means is connected to the gate electrode of another field effect device in said regeneration means.

4. The shift register of claim 3, where said first section and said second section are each comprised of a plurality of series connected field effect devices, said clocking means being connected to said field effect devices and said input terminal being connected to the gate electrode of one of said field effect devices in said first section.

5. The shift register of claim 3, where said further field effect devices in said regeneration means are series connected between said output interelectrode capacitance and said input interelectrode capacitance, the gate electrode of one of said further field effect devices being connected to said clocking means, the gate electrode of another of said further field effect devices being connected to said output interelectrode capacitance.

6. A dynamic shift register comprised of field effect devices having gate, source, and drain electrodes, comprising:

a plurality of storage field effect devices having interelectrode capacitances associated therewith on which voltage pulses can be stored, representative of data;

means separate from said storage field effect devices for receiving input data signals from preceding interelectrode capacitances;

writing means for applying voltage pulses to said interelectrode capacitances, said pulses writing data on said interelectrode capacitances in accordance with said received data signals;

shifting means comprised of field effect devices for shifting data from one said storage field effect device to another in response to clock pulses applied thereto;

regeneration means comprised of further field effect devices connected between said storage field effect devices for recirculating said data rather than shifting it, said regeneration means having as inputs a clock pulse and the voltage pulse of a storage device from which data is to be recirculated; and clock means for applying said clock pulses to said shift means and to said regeneration means.

7. The shift register of claim 6, where said writing means comprises field effect devices connected to the gate electrode of each said storage field effect device, said writing means having as inputs said voltage pulses and said clock pulses.

8. The shift register of claim 7, where said further field effect devices in said regeneration means receive as inputs on their gate electrodes said clock pulses and said data pulses from interelectrode capacitances.

9. The shift register of claim 7, where said regeneration means includes serially connected first and second field effect devices, said first field effect device receiving clock pulses on its gate electrode and said second field effect device receiving on its gate electrode the data pulse of an interelectrode capacitance, the coincidental application of said clock signals and said data pulses causing data to recirculate between interelectrode capacitances to which said regeneration means is connected, rather than being shifted.

10. A dynamic shift register using field effect devices having gate, source, and drain electrodes, for transfer of data signals, comprising:

at least one stage for storage of information therein, said information being stored as voltage pulses on interelectrode capacitances associated with storage field effect devices;

first and second storage field effect devices in each said stage for storage of data on an interelectrode capacitance thereof; said data moving from said first storage field effect device to said second storage field effect device during shifting;

writing means including field effect devices connected to said storage field effect devices for applying voltage pulses to said storage field effect devices for writing data therein, said writing means being responsive to input data signals and to clock pulses applied thereto;

regeneration means comprised of field effect devices connected between said first and second storage field effect devices for recirculation of data in said stage in response to the simultaneous input of a further clock pulse and the voltage pulse on the interelectrode capacitance associated with said second storage field effect device; and clock means for applying said clock pulses to said writing means and to said regeneration means.

11. The shift register of claim 10, where said regeneration means is a discharge path for voltage pulses on said first storage field effect device when said regeneration means receives as simultaneous inputs said further clock pulse and said voltage pulse on said second interelectrode capacitance.

12. The shift register of claim 11, where said inputs are applied to said gate electrodes of said field effect devices in said regeneration means.

13. A field effect dynamic shift register having storage capability, comprising:

a plurality of stages, each of which has storage field effect devices for storage of voltage pulses on interelectrode capacitances thereof, said voltage pulses being representative of data, each said stage including:

a first series connection of field effect devices, one of which is a first storage field effect device;

a second series connection of field effect devices, one of which is a second storage field effect device whose gate electrode is the input terminal for said stage;

means interconnecting said first and second series connections;

regeneration means connecting said second series connection to said first series connection at a location remote from said input terminal, said regeneration means including further field effect devices having as inputs on their gate electrodes a clock pulse and a voltage pulse from a third storage field effect device which is the output of the stage, said regeneration means preventing the shift of data from said first storage field effect device to said third storage field effect device when said inputs to said regeneration means are simultaneously present;

clock means connected to said first and second series connections and to said regeneration means for applying clock pulses thereto, said clock pulses shifting data between said storage field effect devices and writing data pulses on said storage field effect devices.

14. The shift register of claim 13, where said regeneration means is a discharge network for removing voltage pulses from said storage field effect devices when said inputs are applied to said regeneration means.

15. A dynamic shift register, comprising:

a plurality of interconnected stages for storage of data pulses, each said stage having an input section an an output section, said data being stored as voltage pulses on interelectrode capacitances associated with a input storage field effect device and an output storage field effect device in said stage;

shift means interconnecting said storage field effect devices for shifting data from said input storage field effect device to said output storage field effect device in each said stage and for shifting data from each output storage field effect device to the input storage field effect device of the succeeding stage, said means being responsive to the application of clock pulses thereto;

regeneration means interconnecting said storage field effect devices within each stage for preventing shifting of data from said input storage device to said output storage device, said regeneration means being comprised of further field effect devices and conditionally interconnecting said input storage field effect device and said output storage field effect device when clock pulses are applied thereto;

clock means for applying said clock pulses to said shift means and to said regeneration means.

16. The shift register of claim 15, where said further field effect devices in said regeneration means receive as inputs thereto said clock pulses and the voltage pulses on said second storage field effect devices to which data would be transferred by said shift means in the absence of activation of said regeneration means by said clock pulses, said inputs being applied to the gate electrodes of said further field effect devices.

17. The shift register of claim 16, where said input and output sections are comprised of field effect devices, said further field effect devices in said regeneration means being series connected, said series connection being located between said input and output sections of each stage.

18. A dynamic shift register comprised of field effect devices, comprising:

a plurality of interconnected stages, each one of which has an input terminal for receiving input data signals from a preceding stage and first and second storage field effect devices for storage of data as voltage pulses on interelectrode capacitances associated therewith;

shift means interconnecting said first and second storage field effect devices for shifting data from said first storage device to said second storage device;

first writing means for applying voltage pulses to said first storage field effect device in accordance with said data signal on said input terminal, said first writing means being activated by application of first clock pulses thereto;

second writing means for applying voltage pulses to said second storage field effect device in accordance with the data state of said first storage field effect device, said second writing means being activated by the application of second clock pulses thereto;

regeneration means connected to said second writing means and to a terminal of said first writing means remote from said input terminal for applying voltage pulses to said first storage field effect device in accordance with the data state of said second storage field effect device, said regeneration means being activated by third clock pulses applied thereto; and clock means connected to said first and second writing means and to said regeneration means for providing said first, second, and third clock pulses.

19. The shift register of claim 18, where said regeneration means is comprised of further field effect devices whose gate electrodes receive said third clock pulse and the voltage on the interelectrode capacitance associated with said second storage field effect device.

20. The shift register of claim 19, where said first writing means is comprised of first field effect devices which receive said clock pulses and said input data signals on their gate electrodes and said second writing means is comprised of second field effect devices which receive clock pulses on their gate electrodes.

* * * * *